United States Patent [19]
Robinson

[11] 3,817,951
[45] June 18, 1974

[54] LOW-MODULUS THERMOPLASTIC ETHYLENE-TETRAFLUOROETHYLENE-HEXAFLUOROPROPENE TERPOLYMERS

[75] Inventor: Donald Nellis Robinson, Collegeville, Pa.

[73] Assignee: Pennwalt Corporation, Philadelphia, Pa.

[22] Filed: Nov. 20, 1972

[21] Appl. No.: 308,073

[52] U.S. Cl........ 260/80.77, 260/32.6 R, 260/41 A, 260/41 B, 260/41 C, 260/41 AG, 260/80.76, 260/87.5 B, 117/132 CF
[51] Int. Cl. ........................................... C08f 15/40
[58] Field of Search .................................. 260/80.77

[56] References Cited
UNITED STATES PATENTS
2,468,664   4/1949   Hanford et al........................ 260/86

Primary Examiner—Stanford M. Levin

[57] ABSTRACT

A low-modulus, nonelastic, thermoplastic terpolymer composed of copolymerized units (in mole percent) of 40 to 60% ethylene, 20 to 30% tetrafluoroethylene, and 10 to 30% hexafluoropropene.

4 Claims, No Drawings

LOW-MODULUS THERMOPLASTIC ETHYLENE-TETRAFLUOROETHYLENE-HEXAFLUOROPROPENE TERPOLYMERS

This invention concerns a low-modulus terpolymer of ethylene, tetrafluoroethylene, and hexafluoropropene. More particularly, this invention concerns a flexible, nonelastomeric, high molecular weight thermoplastic composed of copolymerized units of 40 to 60% ethylene, 20 to 30% tetrafluoroethylene and 10 to 30% hexafluoropropylene, the total of the three constitutents being 100%. (The proportions of the monomeric components of the copolymers embodied herein are given in molar percents thereof).

Various copolymers of ethylene with fluorinated olefins are known in the art. For example, Hanford et al, U.S. Pat. No. 2,468,664, discloses a copolymer of tetrafluoroethylene and ethylene in which the tetrafluoroethylene is 5% to 95% of the combined weight of the two. These copolymers, however, are crystalline, high-melting-point, high-modulus polymers having extremely high tensile strengths, on the order of 6,000 psi. British patent 1,166,020 concerns a crystalline copolymer of ethylene and tetrafluoroethylene containing 53 to 63 mole percent tetrafluoroethylene. This polymer has high modulus, high melting point, e.g., 269°C, and has extremely high tensile strength, on the order of 7,000 psi. German Patent 1,957,963 discloses copolymers of ethylene and tetrafluoroethylene with a third monomer, either perfluoropropyl perfluorovinyl ether or perfluoro isopropyl allyl ether. These polymers are elastomeric, i.e., having a breaking elongation of 511% extremely low tensile strength, on the order of 760 psi.

I have now discovered a terpolymer of ethylene, tetrafluoroethylene and hexafluoropropene constituted in a critically narrow range of proportions of said components, having a unique combination of properties that imparts to this new thermoplastic a wide range of industrial utilities for which previous fluorine-containing polymers are not suitable. More specifically, the composition of this invention is a transparent and amorphous (non-crystalline), nonelastic, low-modulus, soft and flexible, thermally stable, high molecular weight thermoplastic having a relatively low softening point, i.e., within the range of about 115° to 160°C. The terpolymer of this invention is surprisingly resistant to chemical and solvent attack being unaffected by typical solvents including carbon tetrachloride, benzene, acetone, ethyl alcohol and chlorofluorocarbons, such as trichlorotrifluoroethane, both at ambient and elevated temperatures. Tests with a large number of representative solvents show that the only solvent presently known to have a solvating effect on the compositions of this invention is dimethylacetamide at its boiling point (165°C). The terpolymer of this invention is a polar material having a low dielectric constant which accounts for its good electrical insulating properties. The terpolymer also has outstanding low temperature properties, that is, the polymer retains its flexibility and other good characteristics at temperatures as low as on the order of −15°C to −80°C.

The unusual combination of valuable properties of the present compositions gives them a wide range of scientific and industrial uses where their flexibility, transparency, solvent and chemical resistance, low dielectric constant and other characteristics are preeminent, for example, as jacketing for large diameter cable for the transmission of electrical energy, for other wire insulation, for chemical hose and tubing, for flexible diaphragms for pumps and valves, and for sundry hospital and medical uses such as for transparent bags for the storage of blood and other fluids. For some uses where a material having a higher load bearing capacity is desired, such as in wire insulation, the terpolymer can be crosslinked by conventional means, for instance, by the application of high energy radiation, such as by irradiation with high energy electrons, e.g., 1–2 MEV, 12–30 megarads, or by chemical crosslinking using known curing agents such as organic peroxides exemplified by dicumyl peroxide. The described crosslinking modifications will raise the softening point of the terpolymer to within the range of about 180°C to 275°C. The incorporation of conventional fillers in the terpolymer, either in non-crosslinked or crosslinked condition, will also raise the softening point. Conventional fillers such as carbon black, particulate fiberglass, silica, silicates such as calcium or lead silicate, pigments such as titanium dioxide and zinc oxide, in amounts of about 5 to 20 parts per hundred parts by weight of terpolymer, may be incorporated therein by conventional milling and compounding operations. It is significant that plasticizers are not required for the polymer of this invention because of its inherent flexibility. It is also significant that heat stabilizers are not needed because of the polymer's inherent thermal stability.

As mentioned previously, the terpolymer embodied herein is composed of 40 to 60% ethylene, 20 to 30% tetrafluoroethylene and 10 to 30% hexafluoropropylene. The preferred compositions, that is, those having the most favorable overall combination of properties, are composed of copolymerized units of ethylene, terrafluoroethylene and hexafluoropropene in the molar ratios, respectively, of 1.7:1:1 to 2:1:1. A particularly preferred product, with regard to the properties of low modulus and maximum flexibility, is a terpolymer containing on the order of 50% ethylene, 23% tetrafluoroethylene and 27% hexafluoropropylene. Another preferred polymer, with regard to best low temperature properties while still having good flexibility, is a terpolymer of 50% ethylene, 30% tetrafluoroethylene and 20% hexafluoropropylene. Because of differing reactivity ratios, the ethylene moiety in the polymer chain alternates with the tetrafluoroethylene and hexafluoropropylene moieties so that the polymer chain contains the following structural units: — $CH_2CH_2CF_2CF_2$ — and

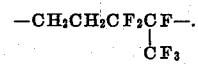

The latter units, having the pendant $CF_3$ groups, are believed to contribute greatly to the high flexibility, low modulus, and amorphous nature of the polymer.

Because of the aforesaid differing reactivity ratios of the monomeric components, the monomers which are reacted to provide the high molecular weight terpolymer of this invention are charged to the reaction in somewhat different proportions than those ultimately found in the terpolymer product. Generally, the monomers mixture which is reacted is composed of 45 to 60% ethylene, 15 to 20% tetrafluoroethylene and 20 to 40% hexafluoropropene on a molar basis. More explicity, a monomers feed mixture wherein the ethylene-:tetrafluoroethylene:hexafluoropropene ratio is 3:1:2 yields a terpolymer product wherein the ratio of said copolymerized components is on the order of 2:1:1. A monomers feed mixture wherein the ratio of the ethylene to tetrafluoroethylene to hexafluoropropylene is 3:1:1 gives a terpolymer product wherein the ratio of said copolymerized components averages on the order of 2.75:1.75:1. The preferred monomers feed mixtures contain from 50 to 60% ethylene, from 17 to 20% tetrafluoroethylene and from 20 to 34% hexafluoropropylene, and give desirable products containing about 50% ethylene, from 20 to 30% tetrafluoroethylene and from 15 to 27% hexafluoropropylene. It will be apparent to those skilled in the polymer arts that only a nominal amount of routine experimentation is required in adjusting the compositions of the monomers mixture to obtain the specifically desired molar ratio of constituents in the terpolymer within the ranges as above set forth.

The terpolymer is conveniently prepared by polymerizing the aforesaid monomers mixture in stirred aqueous reaction medium containing a reaction accelerator, the reaction being initiated by a free radical catalyst at a temperature ranging from 35° to 60°C and at a reaction pressure of about 200 to 500 psi. The aqueous medium may range from 400 to 800 parts per hundred parts by weight of monomer. The aqueous medium will contain from about 0.2 to 1%, based on monomer weight, of conventional dispersing agent, such as a high molecular weight polyethylene glycol. A preferred reaction accelerator is 1,1,2-trichloro-1,2,2-trifluoroethane in amounts varying from 90 to 150% by weight of the monomers. The preferred initiators are the dialkyl peroxy dicarbonates, particularly diisopropylperoxydicarbonate. The initiator concentration may range from 2 to 4% by weight of the monomers. Reaction periods will normally vary from 4 to 10 hours. The terpolymer product is recovered from the reaction medium (by filtration) as discrete beads within the particle size range of about 1 to 3 mm.

The molecular weights of the terpolymers embodied herein are gauged by determining the "plasticity number" which is an empirical index relating to melt flow. The plasticity number is the area in square millimeters of a plaque made by placing 0.5 gram of particulate polymer piled in a cone between the platens of a Carver Press heated to 225°C. The platens are brought together to compress the powder under slight pressure (less than 50 psi), and the powder is preheated in this manner at 225°C for 2 minutes. A pressure of 3,000 psi is then applied for 60 seconds at the same temperature. The greater the area of the polymer plaques so produced, the lower the molecular weight of the polymer, and conversely. The terpolymers embodied herein have plasticity numbers in the range of about 1,000 to 7,000 and preferably 2,000 to 5,000. The flexibility of polymers is normally measured by the modulus value, that is, the load in pounds per square inch of initial cross-sectional area necessary to produce a stated percentage elongation, and which value is determined herein by ASTM Method D1530-58T. The terpolymers of this invention have a modulus which is, in general, less than $7 \times 10^4$ psi and usually is in the range of $8 \times 10^3$ to $6 \times 10^4$ psi. The low temperature properties of the terpolymers are characterized by their "brittle points", i.e., the highest temperatures in a series of low temperatures at which the polymer specimen fractures when bent on a cold, 0.25 inch diameter steel rod. Tensile yield strength, tensile break strength, and elongation are measured according to ASTM Method D1708-59T, using an Instron Model No. TM, Series No. 1785 tensile testing machine. The tensile yield strength and tensile break strength of the terpolymers embodied herein will be in the range of about 1,000 to 2,500 and about 1,300 to 3,000 psi, respectively. Elongation at break is in the range of about 150 to 300%.

The following examples are presented to illustrate the preparation of terpolymers of the invention and to demonstrate their unique physical properties.

EXAMPLE 1

A terpolymer of 50% ethylene, 25% tetrafluoroethylene, and 25% hexafluoropropene is prepared as follows. A vertical, two gallon stainless steel autoclave is charged with four liters deionized water containing four grams polyethylene glycol, molecular weight 20,000 ("Carbowax 20M"). To this aqueous medium is added a solution of 6 grams of diisopropylperoxydicarbonate initiator in 500 ml of 1,1,2-trichloro-1,2,2-trifluoroethane. The reactor is purged with nitrogen and evacuated, 579 grams hexafluoropropene is added and agitation at 1,000 rpm commenced. Then 130 grams of an ethylene/tetrafluoroethylene mixture (74.5 mole percent ethylene/25.1 mole percent tetrafluoroethylene) is added to provide a pressure of 250 psig. The reactor is warmed to 45°C and additional amounts of this monomers mixture is added to increase pressure to 400 psig. A 2.5% solution of initiator in 380 ml of trichlorotrifluoroethane is incrementally added to the reactor over a 2 hour period, during which time a total of 370 grams of the ethylene-tetrafluoroethylene mixture also is slowly added. After five hours, the pressure in the reactor drops to 210 pounds/in.$^2$ at which time the reactor is cooled and vented. The overall monomer feed composition reacted is thus 50% ethylene, 17% tetrafluoroethylene, and 33% hexafluoropropene. The temperature of the reaction ranged from 40° to 45°C. The terpolymer product is recovered as beads which are 1 to 3 mm in diameter. They are washed with boiling deionized water, filtered, rinsed and dried over night at 110°C in an air oven. Total polymer recovered is 457 grams (48% conversion). The terpolymer has the following properties:

Plasticity Number, 2610 mm$^2$
Modulus, $2.5 \times 10^4$ psi.
Tensile Yield Strength, 1,100 psi
Tensile Break Strength, 2,200 psi
Elongation at Break, 280%

A molding of the terpolymer (3 inch × 3 inch × 0.03 inch) was very flexible, attractively transparent, and non-flammable when contacted with a laboratory flame. The molding had a brittle point of −30°C. A film of the terpolymer was insoluble in trichlorotrifluoroethane and insoluble in acetone both at room temperature and at the boiling point. The good extrusion properties of the terpolymer were confirmed by preparing a smooth extrudate in a capillary rheometer at 132°C.

A powder coating of the polymer on steel was readily made by dipping a pre-heated steel panel (about 300°C) into the particulate polymer, then heating in a 125°C oven for 10 minutes for complete fusion. The coating was smooth, transparent, and strongly adherent to the steel.

The excellent thermal stability of the polymer was confirmed by determing that the polymer showed only a 6% weight loss when heated at 200°C for 16 hours. However, no weight loss was noted after the polymer was held at the normal extrusion temperature of 140°C for 16 hours.

EXAMPLE 2

This example demonstrates the preparation of a terpolymer composed of 46% ethylene, 27% tetrafluoroethylene and 27% hexafluoropropene, using the same procedure as in Example 1, except for the following differences. The overall monomer feed composition was 49.6% ethylene, 16.8% tetrafluoroethylene, and 33.6% hexafluoropropene, and the total hexafluoropropene feed was 601 grams. The reaction pressure ranged from 440 psig during polymerization, down to 190 psig final. The reaction temperature ranged from 46°C to 51°C. The incremental initiator addition was a 2.5% solution of diisopropylperoxydicarbonate in 341 ml. trichlorotrifluoroethane. The polymer recovered was 454 grams, a 47% conversion. The properties of the terpolymer product were as follows:
  Plasticity Number, 10,000 mm$^2$
  Modulus, 8.4 × 10$^3$ psi
  Tensile Yield Strength, 1,600 psi
  Tensile Break Strength, 2,400 psi
  Elongation at Break, 240%
  Brittle Temperature, −15°C
A relatively thick transparent flexible film (7 mils) was easily molded at 130°C.

EXAMPLE 3

This example demonstrates the preparation of a terpolymer composed of 50% ethylene, 30% tetrafluoroethylene, and 20% hexafluoropropene, using the same general procedure as in Example 1 except that the monomer feed molar ratio was 3:1:1 rather than 3:1:2. Total hexafluoropropene fed was 331 g., and total ethylene/tetrafluoroethylene fed was 370 g. Initiator used was 14 g. Reaction time was 4 hours, and temperature range was 40°–45°C. Pressure ranged from 410–210 psig. Product recovered was 340 g., a 49% conversion. Properties of the terpolymer were:
  Plasticity Number, 1260 mm$^2$
  Modulus, 5.7 × 10$^4$ psi
  Tensile Yield Strength, 1,700 psi
  Tensile Break Strength, 3,000 psi
  Elongation at Break, 290%
  Brittle Temperature, below −78°C
  Molding Temperature, 180°C The following examples illustrate the modification of the properties of the terpolymer by conventional irradiation and chemical crosslinking techniques.

EXAMPLE 4

The terpolymer prepared as described in Example 1 is molded into a 3 inch × 3 inch × 0.03 inch plaque which is irradiated with electrons, intensity of 12 megarads. The modification of the polymer by crosslinking is indicated by the following changes in physical properties, including decreased solubility in boiling dimethylacetamide (DMAC) solvent:

|  | Before | After Irradiation |
|---|---|---|
| Softening Temperature, °C | 140 | 180 |
| Tensile Break Strength, psi | 2,200 | 2,800 |
| % Gel, in hot DMAC | 0 | 37 |

EXAMPLE 5

A terpolymer as described in Example 1 is compounded on a rubber mill using the following recipe: Polymer, 100 g; MT carbon black, 20 g; magnesium oxide, 15 g; calcium hydroxide, 6 g; zinc oxide, 3 g; dicumyl peroxide on inert carrier, 10 g; and hexamethylenediamine carbamate; 1 g. The compounded polymer is pressed in a mold at 160°C for 20 minutes to form a 3 inch × 3 inch × 0.03 inch plaque, which is then oven-aged for 22 hours at 204°C. The modification of the filled polymer by crosslinking is shown by the following changes in physical properties.

|  | Before Curing | After Curing |
|---|---|---|
| Modulus, psi | 2.8 × 10$^4$ | 1.1 × 10$^5$ |
| Tensile Break Strength, psi | 2,100 | 2,850 |
| Elongation, % | 240 | 60 |

I claim:

1. A low-modulus, nonelastic, amorphous, flexible, thermally stable, high molecular weight, thermoplastic terpolymer having a softening point in the range of about 115°C. to 160°C. composed of copolymerized units of, in mole percent, from 40% to 60% ethylene, 20% to 30% tetrafluoroethylene, and 10% to 30% hexafluoropropylene.

2. A terpolymer according to claim 1 wherein the molar ratio of ethylene:tetrafluoroethylene:hexafluoropropylene is in the range 1.7:1:1 to 2:1:1

3. A terpolymer according to claim 1 composed of 50% ethylene, 23% tetafluoroethylene and 27% hexafluoropropylene.

4. A terpolymer according to claim 1 composed of 50% ethylene, 30% tetrafluoroethylene and 20% hexafluoropropylene.

* * * * *